United States Patent [19]

DiGianni

[11] Patent Number: 5,598,681
[45] Date of Patent: Feb. 4, 1997

[54] RESIN BASEBOARDS

[75] Inventor: Mike DiGianni, Woodbridge, Canada

[73] Assignee: Imperial Plastics Extrusions Limited, Woodbridge, Canada

[21] Appl. No.: 201,422

[22] Filed: Feb. 24, 1994

[51] Int. Cl.$^6$ .................................................. E04F 19/02
[52] U.S. Cl. ............................. 52/717.05; 52/718.01; 52/718.04; 52/288.1
[58] Field of Search ............... 52/718.01, 718.04, 52/718.05, 287.1, 288.1, 220.5, 220.1, 242, 717.01, 717.05, 716.5, 716.6

[56] References Cited

U.S. PATENT DOCUMENTS

| | | | |
|---|---|---|---|
| 2,297,887 | 10/1942 | Hall et al. | 52/718.04 |
| 3,228,160 | 1/1966 | O'Brien | 52/718.04 X |
| 3,911,637 | 10/1975 | Schmidiger | 52/718.01 X |
| 4,165,577 | 8/1979 | Shanahan et al. | 52/288.1 X |
| 4,204,376 | 5/1980 | Calvert | 52/718.01 X |
| 5,274,972 | 1/1994 | Hansen | 52/718.01 X |

*Primary Examiner*—Carl D. Friedman
*Assistant Examiner*—Wynn E. Wood

[57] ABSTRACT

A baseboard made from a resin material comprises an upright body formed with a backwall which abuts with a room wall, a front cover on the upright body and an internal hollow between the backwall and the front cover. The front cover is releasably secured to the upright body for gaining access to and then covering the internal hollow.

1 Claim, 2 Drawing Sheets

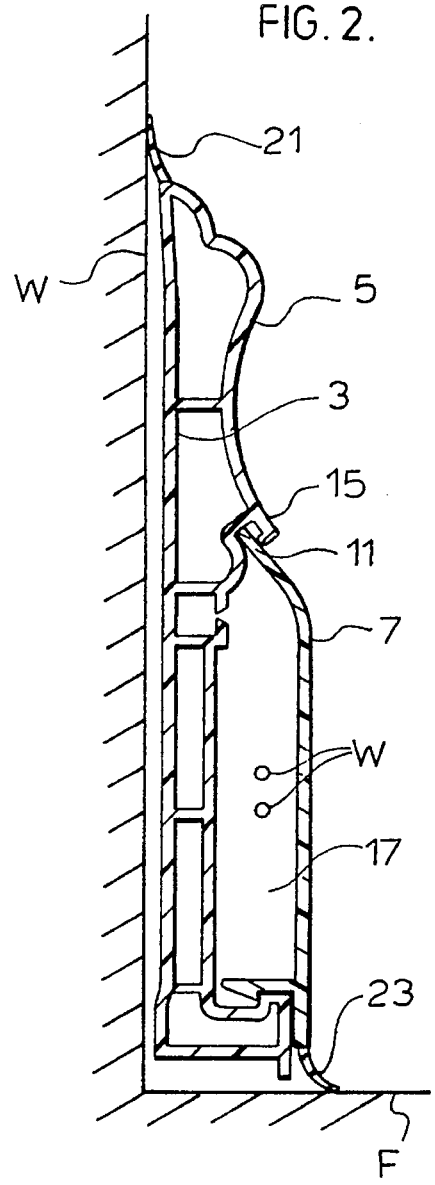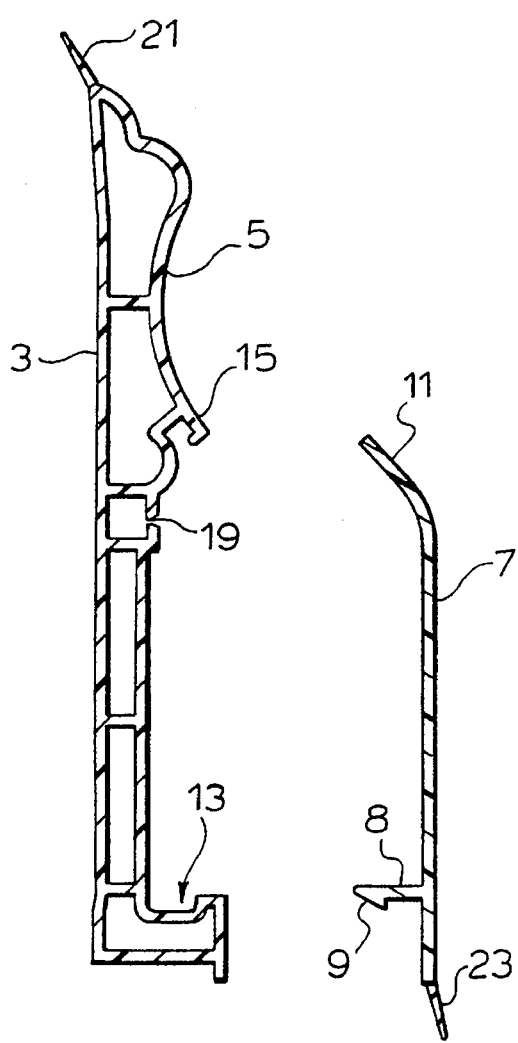

RESIN BASEBOARDS

FIELD OF THE INVENTION

The present invention relates to a resin material baseboard having an internal hollow.

BACKGROUND OF THE INVENTION

In order to give a room a finished appearance it is often completed with a baseboard located at floor level and rising to a height of several inches at the base of the room wall. Conventional baseboards have a wooden construction and are typically installed by a carpenter.

There are drawbacks with conventional wooden baseboards. Firstly, carpenters are expensive and substantial care must be taken to ensure that the paint does not get onto the flooring beneath the baseboard. Furthermore, the baseboard itself is subject to damage and paint chipping and generally requires frequent maintenance.

Conventional wooden baseboards have no function other than their esthetic appeal.

SUMMARY OF THE INVENTION

The present invention relates to a baseboard made from resin material. The baseboard comprises an upright body formed with a backwall which seats against a room wall and has a front surface including a front cover and an internal hollow between the backwall and the front cover. The front cover is releasably secured to the upright body of the baseboard which allows access to the internal hollow which can be used to receive speaker wire and the like. The cover when fitted onto the baseboard covers the internal hollow and anything which is placed in the hollow.

The resin backboard can be manufactured in various different colors eliminating the requirement for painting. Furthermore, because of its resin construction with integrated coloring the baseboard of the present invention is extremely durable and stands up to substantial abuse without the requirement for constant maintenance.

The resin baseboard is relatively easy to install and does not require the expensive services of a carpenter.

BRIEF DESCRIPTION OF THE DRAWINGS

The above as well as other advantages and features of the present invention will be described in greater detail according to the preferred embodiments of the present invention in which;

FIG. 2 is a sectional view along the lines 2—2 of FIG. 1;

FIG. 3 is a view similar to FIG. 2 with the front cover removed from the resin baseboard.

Figure 1:
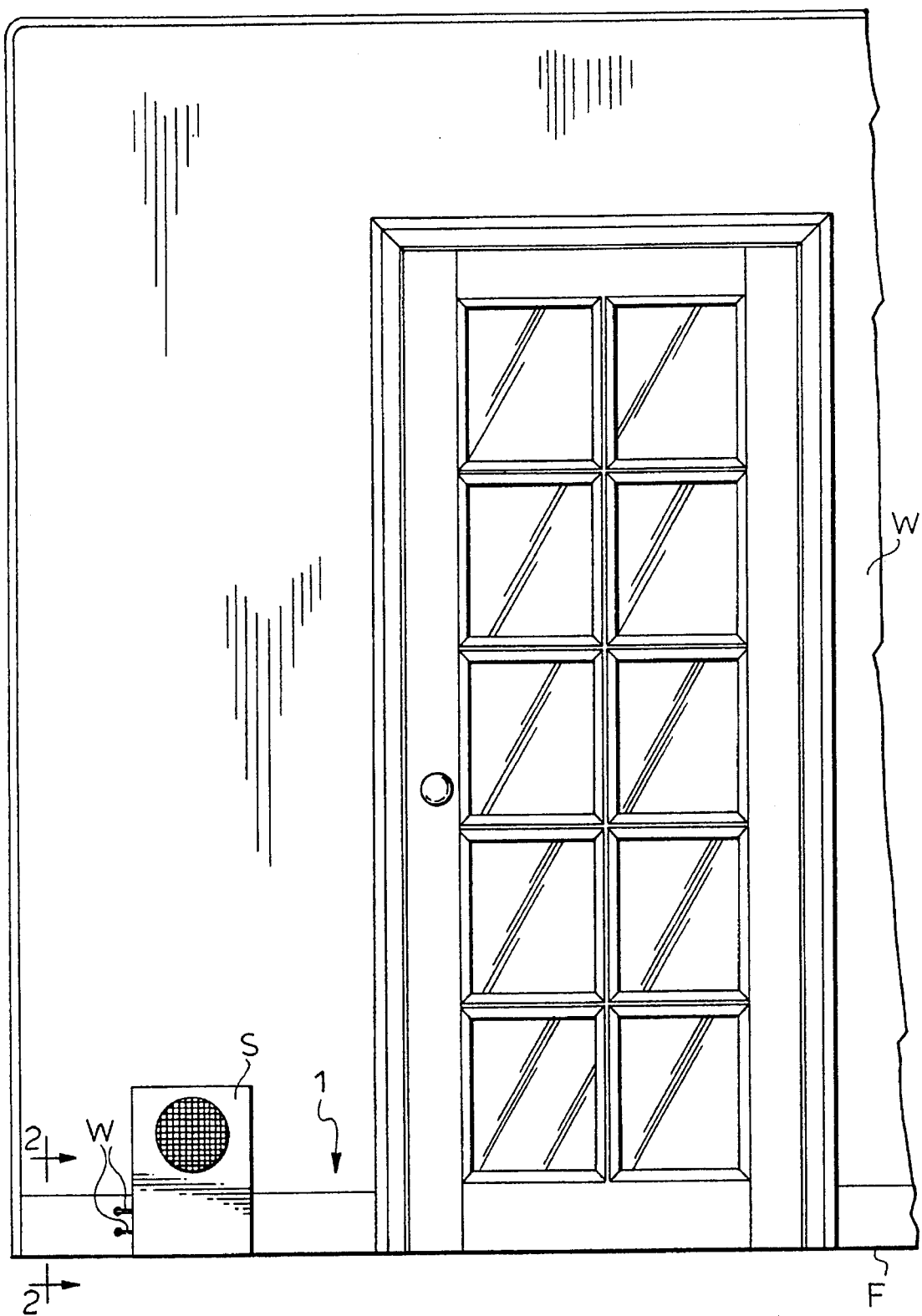
FIG. 1 shows the interior of a room completed with a resin material baseboard according to a preferred embodiment of the present invention.

DETAILED DESCRIPTION ACCORDING TO THE PREFERRED EMBODIMENTS OF THE PRESENT INVENTION

FIG. 1 shows the interior of a room having an upright wall W and a floor F. The floor may either be carpeted or uncarpeted.

Running around the base of the wall at the floor level is a baseboard generally indicated at 1. In accordance with the present invention baseboard 1 has a resin and preferably an extruded vinyl construction.

As seen in FIGS. 2 and 3 of the drawings, baseboard 1 has a relatively tall or upright narrow construction and is formed with a flat backwall 3 and a front surface comprising an upper front portion 5 and a front cover 7 below the upper front surface 5 of the baseboard.

Although the entire baseboard has a generally hollow construction, it includes an accessible internal hollow region generally indicated at 17. This internal hollow region is located between the front cover 7 and the backwall 3 of the baseboard. As clearly shown in comparing FIGS. 2 and 3, cover 7 is removable from the baseboard for gaining access to the internal hollow 17.

Located internally of the baseboard is a screw port 19. This screw port leads towards the flat backwall 3 of the baseboard and is used to receive a screw for securing the baseboard to the wall. As will be appreciated a number of these screw ports are provided along the length of the baseboard.

Screw port 19 is located within the hollow 17 and is accessible by removing cover 7 from the baseboard. Once the screws have been fitted through the baseboard secured into the wall, they are then covered by cover 7.

In the preferred embodiment cover 7 has a right angle step 8 near its lower end. Step 8 includes an end barb 9. The body of the baseboard includes a corresponding right angle step 13 which receives barb 9 on step 8 at the bottom end of the cover. The body of the baseboard also includes an undercut 15 at the upper end of the hollow 17 and the upper end 11 of cover 7 fits into the undercut recess 15. Since the cover is bendable the cam shaped barb 9 is then slid and snap locked into the undercut recess 13.

As will be appreciated, in order to release the cover, the upper end 11 must be deflected downwardly out of the undercut recess 15 which then allows the cover to be pulled off of the baseboard. As will be further appreciated, the resilient or flexible nature of the vinyl or other resin construction of the baseboard results in the ability to bend the cover in and out of its interlocking position with the baseboard.

The baseboard includes flexible skirts 21 and 23 at its upper and lower ends. These skirts which are formed integrally with the main body portion and the cover are made from a vinyl material having a substantially lower Durometer hardness than that of the rest of the baseboard and will easily flex to cover wall and floor imperfections. The lower skirt 23 can also be made as part of the main body of the baseboard rather than as part of the cover.

It will be understood from the description above, that installation of the baseboard is accomplished in a simple and efficient manner. Furthermore, the baseboard can be co-extruded with a covering material of a desired color and the color cannot easily be chipped or worn off of the baseboard. The flexible skirts 21 and 23 would also be co-extruded with the baseboard.

Another benefit of the baseboard is that it can be used to hide items which would otherwise be exposed at the base of the wall. For example, FIG. 1 shows a speaker S located in the room. Speaker S is wired back to an amplifier by means of wires W. These wires would normally be seen running around the base of the wall or in the case of a carpeted floor can be hidden beneath the carpet. However, in accordance with the present invention, the wires are fed directly into hollow 17 where they are hidden internally of the baseboard. The fitting of the wires into the hollow is an extremely simple operation by simply removing cover 7, fitting the wires inside the baseboard and then replacing the cover to hide the wires within the baseboard. In order to initially fit the wire through cover 17, the cover may be provided with small wire receiving openings as shown.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A wall provided with a resin material baseboard used at a juncture of the wall and a floor, said baseboard comprising an upright body formed with a back wall extending vertically along the wall, a front cover and an internal hollow space between said back wall and said front cover, said front cover being releasably secured by a snap lock to said upright body for gaining access to and then covering said internal hollow space, said upright body including an undercut recess and said cover including a first end which snaps into said undercut recess.

* * * * *